United States Patent [19]
Anderson

[11] 3,873,192
[45] Mar. 25, 1975

[54] ADJUSTABLE TEMPLE FOR EYEGLASSES

[75] Inventor: Marshall N. Anderson, Grayslake, Ill.

[73] Assignee: Sellstrom Manufacturing Co., Palatine, Ill.

[22] Filed: Feb. 28, 1974

[21] Appl. No.: 446,633

[52] U.S. Cl. .............................................. 351/118
[51] Int. Cl. ........................................... G02c 5/20
[58] Field of Search ...................... 351/118, 119, 19

[56] References Cited
UNITED STATES PATENTS
3,133,141  5/1964  Anderson............................ 351/118

*Primary Examiner*—Paul A. Sacher

[57] ABSTRACT

Adjustable temples are provided which are adapted to be connected to the frame of a pair of eyeglasses. Each temple is of like construction and includes first and second members slidably interconnected and manually adjustable to assume selected positions of adjustment wherein the length of the temple may be varied. One of the members is provided with an elongated longitudinally extending guideway in which a portion of the other member is slidably disposed. An elongated, longitudinally extending resilient member is disposed within the guideway. A portion of the other member is positioned between and is in frictional engagement with the resilient member and a wall of the guideway. The manual adjustment of the members is effected only when a predetermined amount of external force is applied so as to overcome the frictional engagement retaining the members in a selected position of adjustment.

11 Claims, 12 Drawing Figures

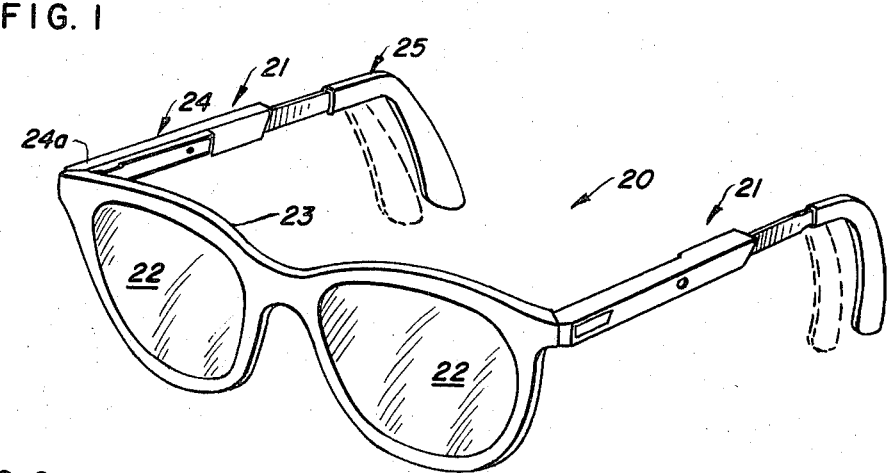
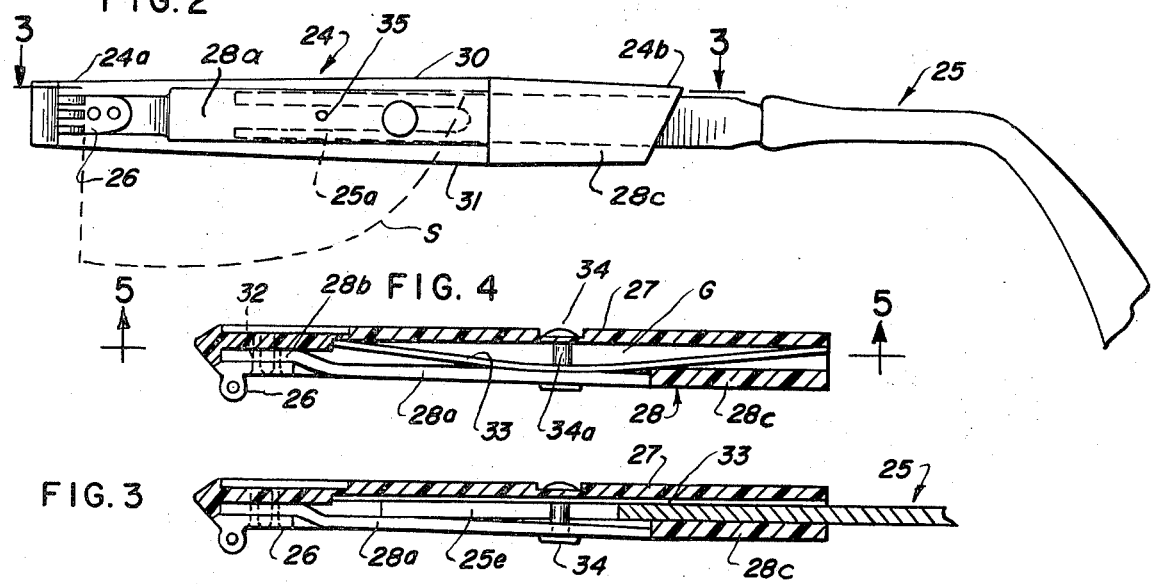
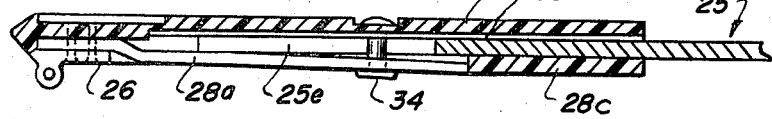
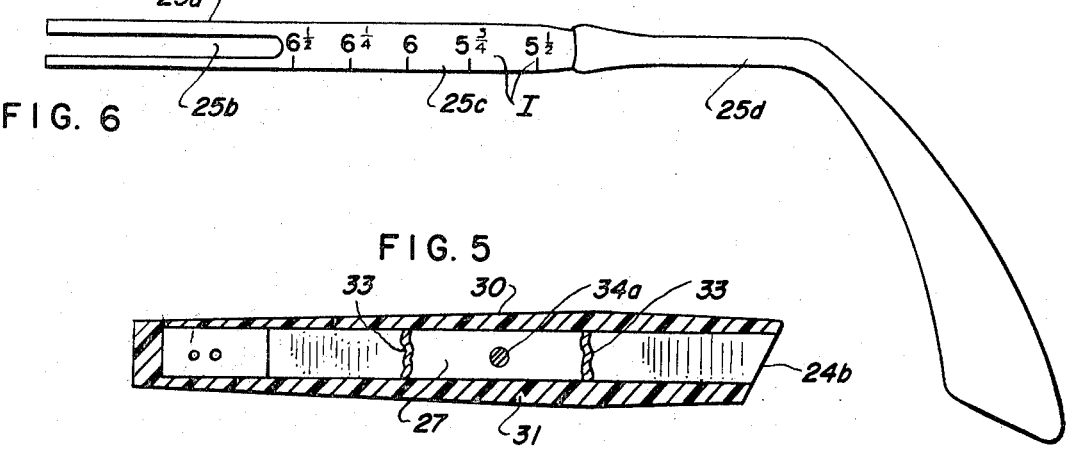

PATENTED MAR 25 1975 3,873,192
SHEET 2 OF 2
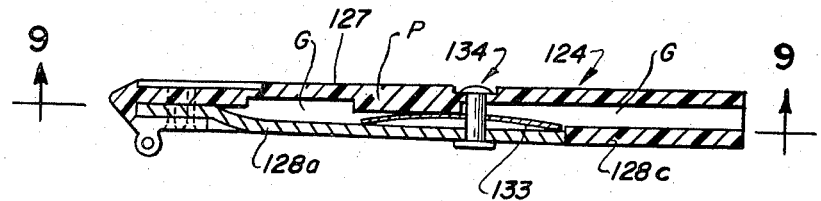
FIG. 8
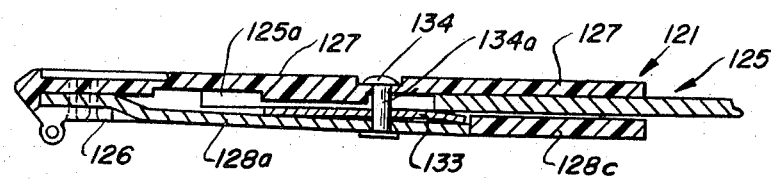
FIG. 7
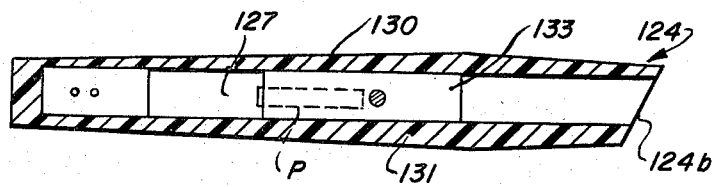
FIG. 9
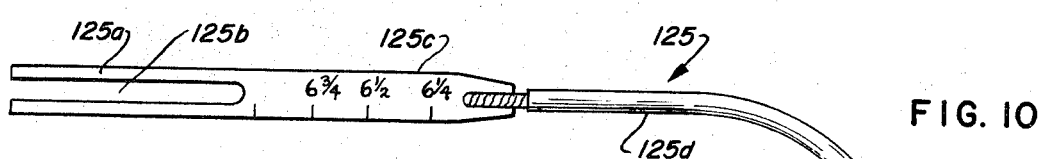
FIG. 10
FIG. 11
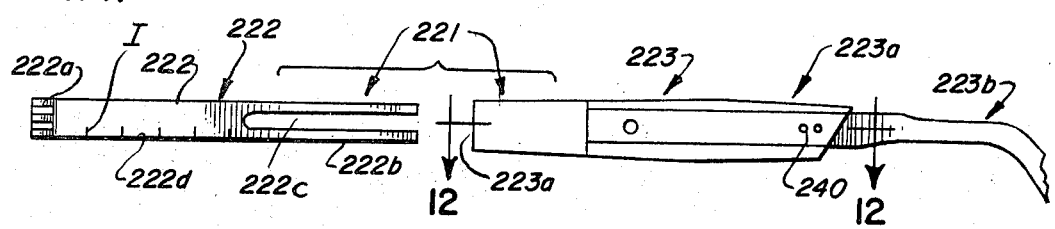
FIG. 12
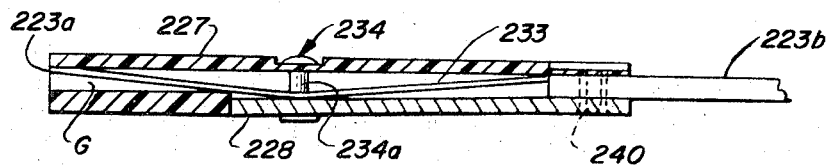

ADJUSTABLE TEMPLE FOR EYEGLASSES

BACKGROUND OF THE INVENTION

Various adjustable temples for eyeglasses have heretofore been proposed; however, because of certain design characteristics, they have been beset by one or more of the following shortcomings: (a) the temple was of a complex and costly construction and oftentimes had an unattractive appearance; (b) the temple was inordinately heavy and bulky and uncomfortable to wear; (c) special tools were required to effect adjustment; (d) numerous components were required and certain of said components were susceptible to becoming lost, and (e) the temple components would not effectively remain in an adjusted position and, thus, necessitated frequent readjustment.

SUMMARY OF THE INVENTION

Thus, it is an object of the invention to provide an adjustable temple which avoids the aforenoted shortcomings associated with prior constructions.

It is a further object of the invention to provide an adjustable temple which may be readily utilized with a variety of eyeglass frames.

It is a still further object of the invention to provide an adjustable temple which is strong and capable of withstanding abusive handling and, thus, is suitable for use on safety glasses worn while performing numerous manufacturing or manual operations.

Further and additional objects will become apparent from the description, accompanying drawings and appended claims.

In accordance with one embodiment of the invention, an adjustable temple for a pair of eyeglasses is provided which includes first and second members adjustably interconnected so that the length of the temple may be varied as desired. The first member has one end thereof hingedly connected to the eyeglass frame. One of the members is provided with a longitudinally extending elongated guideway in which a portion of the other member is slidably mounted. Disposed within the guideway is an elongated longitudinally extending spring. The spring is adapted to engage the portion of the other member and frictionally hold same against a wall of the guideway. A transversely extending element is disposed within the guideway and is adapted to be slidably accommodated within an elongated, longitudinally extending slot formed in the portion of the other member. Relative adjustment of the first and second members is effected only upon a predetermined manual force being applied which will overcome the frictional engagement retaining the members in a selected position of adjustment.

DESCRIPTION

For a more complete understanding of the invention, reference should be made to the drawings wherein FIG. 1 is a perspective view of a pair of eyeglasses embodying one form of the improved adjustable temples.

FIG. 2 is an enlarged side elevational view of one of the adjustable temples of FIG. 1 showing the side thereof which is disposed adjacent the head of the wearer.

FIG. 3 is a fragmentary sectional view taken along line 3—3 of FIG. 2.

FIG. 4 is similar to FIG. 3 but showing only the temple component which is hingedly connected to the frame of the eyeglasses.

FIG. 5 is a fragmentary sectional view taken along line 5—5 of FIG. 4.

FIG. 6 is a fragmentary side elevational view of only the temple component shown in FIG. 1 which engages the ear of the wearer.

FIG. 7 is similar to FIG. 3 but showing a second form of the improved adjustable temple.

FIG. 8 is similar to FIG. 4 but showing the component of the temple of FIG. 7 which is hingedly connected to the frame of the eyeglasses.

FIG. 9 is a fragmentary sectional view taken along line 9—9 of FIG. 8.

FIG. 10 is similar to FIG. 6 but showing only the component of the temple of FIG. 7 which engages the ear of the wearer.

FIG. 11 is an exploded side elevational view of a third form of the improved adjustable temple.

FIG. 12 is a sectional view taken along line 12—12 of FIG. 11.

Referring now to the drawings and more particularly to FIG. 1, a pair of eyeglasses 20 is shown which embodies one form of the improved adjustable temples 21. The pair of eyeglasses includes a pair of lenses 22 which may be of unbreakable material and, if desired, be ground to include a prescription for correcting the eyesight of the wearer. Where, however, the eyeglasses (e.g., safety glasses) are to be worn by various persons, the lenses would not be prescription ground.

The lenses 22 are mounted within a frame 23 which may be formed of plastic, metal or a combination of both. The size, shape and style of the lenses and frame may be varied from that shown without departing from the scope of the invention.

The temples 21 shown in FIG. 1 are of like construction and only one temple will hereinafter be described in detail. Temple 21 includes first and second members 24 and 25, see FIG. 2, which may be adjusted relative to one another to vary the length of the temple. Member 24 has one end 24a thereof hingedly connected to one side of frame 23 by a conventional hinge piece 26. The opposite or outer end 24b of member 24 is open so as to receive an end 25a of member 25. Formed within member 24 is an elongated longitudinally extending guideway G which is closed at the end thereof adjacent hinge piece 26. The guideway G is defined by an outer wall 27, a sectional inner wall 28, a top wall 30 and a bottom wall 31. The sectional inner wall 28, in the illustrated embodiment, includes an elongated metallic section 28a which has an offset end 28b connected to the hinge piece 26 by suitable fasteners 32. The other section 28c of wall 28 is disposed endwise of and substantially coplanar with section 28a. Section 28c, outer wall 27, top wall 30 and bottom wall 31 may be of a molded one-piece construction.

Disposed within guideway G and being substantially coextensive therewith is a leaf spring 33 which is adapted to normally assume a bowed configuration, see FIG. 4. An opening is formed at approximately midlength of the spring to slidably accommodate the shank 34a of a rivet or pin 34 which extends transversely of the guideway and interconnects the outer wall 27 and the inner wall section 28a. The opening is of such a size that the spring may be readily flexed without interference by the shank.

Temple member 25 has one eend portion 25a which is adapted to be slidably disposed within the guideway G. As seen in FIG. 6, end portion 25a is bifurcated or provided with an open-ended slot 25b which is adapted to slidably accommodate the shank 34a of the rivet. When members 24 and 25 are assembled as seen in FIGS. 1, 2 and 3, the end portion 25a will be positioned between the leaf spring 33 and the sectional inner wall 28 and be frictionally retained in any desired position of adjustment. If spring 33 was positioned within the guideway so that it bowed outwardly rather than inwardly, as seen in FIG. 4, then the end portion 25a would be positioned between the spring and the outer wall 27. In either situation the end portion 25a would be frictionally retained in a desired position of adjustment.

The length of end poriton 25a of temple member 25 is greater than the length of guideway G so that there will always be a segment 25c thereof which will protrude from the open end 24b of member 24 and, thus, be exposed. The inner surface of segment 25c is provided with suitable indicia I which may be calibrated and, thus, facilitate proper adjustment of the temple length for a particular person.

Temple member 25 is provided with an outer portion 25d which extends endwise from and is integral with end portion 25a. Outer portion 25d is shaped so as to comfortably engage theear of the wearer. The style or type of outer portion 25d may be spatula, cable, etc., which are well known in the art. FIG. 6 shows a spatula type and FIG. 10 shows a cable type.

Where the eyeglasses are of a type commonly referred to as safety glasses, it may be desirable or necessary that a protective half-side shield S, shown in phantom lines in FIG. 2, be secured by suitable fastening means (e.g., screw or rivet) to the inner wall 28 of member 24. To facilitate the securement of the half shield to member 24, an opening 35 may be provided in section 28a, see FIG. 2, to receive the screw or rivet.

FIGS. 7–9 show a modified or second form of the improved adjustable temple 121. To facilitate understanding of temple 121, portions thereof which are the same or similar to those of temple 21 will be given the same identifying number but in the one hundred series. The differences between temple 21 and 121 reside in the member 124, as seen in FIGS. 8 and 9. In lieu of the elongated leaf spring 33 of member 24, a substantially shorter leaf spring 133 is utilized in member 124 and is disposed within guideway G at approximately its mid-length. In addition, outer wall 127 is provided with an elongated protuberance P which extends into the guideway and serves a dual function; first, the protuberance P provides reinforcement for the outside wall 127 of the member and, secondly, the protuberance is slidably accommodated in the slot 125b formed in the end portion 125a of the temple member 125, see FIG. 10, and thereby provides a more effective guide for member 125 when it is being moved relative to member 124.

The members 24 and 124 are illustrated as each having a sectional inner wall 28 or 128; however, this is not essential provided the member is formed of suitable metal or a desirable plastic in which case, in certain instances, the inner and outer walls and the top and bottom walls might be of unitary or one-piece construction.

FIGS. 11 and 12 show a third form of the improved adjustable temple 221 which includes a pair of slidably interconnected members 222 and 223. Member 222 is elongated and has one end 222a thereof provided with means for hingedly connecting same to the eyeglass frame 23. The opposite or outwardly disposed end 222b is provided with an elongated, longitudinally extending, open end slot 222c. The segment 222d of member 222, which is between end 222a and the inner end of slot 222c, is provided with calibrated indicia I. Member 222 is preferably formed of a suitable metal or a rigid nonbreakable plastic.

Member 223 has an open-ended first section 223a which is provided with a guideway G of substantially the same dimension as the guideway G of temple 21. Disposed within the guideway G is an elongated longitudinally extending leaf spring 233 which normally assumes a bowed condition. An opening is provided at approximately mid-length of the spring to slidably accommodate the shank 234a of a transversely extending rivet or pin 234. The outwardly facing end of section 223a is joined to an ear-engaging second section 223b. In the illustrated embodiment, FIG. 12, the sections 223a and b are interconnected by suitable fastening means 240. If desired, however, section 223a and b may be of a molded one-piece construction. Rivet or pin 234 is shown as interconnecting the outer wall 227 of the guideway G to an inner wall portion 228 which may be of metal, if desired. When temple 221 is in assembled relation, the slotted end 222b of member 222 is inserted into the open end of the guideway G formed in member 223. The inserted end of member 222 will cause spring 233 to be distorted whereby the inserted end will be frictionally held between the spring 233 and wall portion 228. The extent to which the member 222 is inserted into the guideway G will be visually indicated by the calibrated indicia I on segment 222d of member 222. The ear-engaging section 223b of member 223 may be of a spatula, cable or other suitable design. Furthermore, if desired, the walls defining the guideway in temple section 223 may be of type shown in FIGS. 7 and 8 wherein a shorter leaf spring is utilized.

Thus, it will be seen that an adjustable temple has been provided which is of simple, yet sturdy, construction; is comfortable to wear; and can be readily adjusted in length without requiring special tools or the like.

I claim:

1. An adjustable temple for the frame of a pair of eyeglasses, said temple comprising elongated first and second members slidably interconnected and manually adjustable to assume selected relative positions, said first member having one end for hingedly connecting to the frame, said second member having an ear-engaging portion, one of said members being provided with an elongated, longitudinally extending guideway open at one end, the other member having an elongated shank portion extending through the open one end and being disposed within said guideway for selected sliding adjustment; and an elongated longitudinally extending spring means disposed substantially moveable independently thereof to within said guideway and resiliently engage said shank portion and effect frictional engagement thereof between said spring means and a wall of said guideway whereby said first and second members are retained in a selected position of adjustment until a predetermined external force is applied to the members overcoming the resistance of the frictional engagement.

2. The adjustable temple of claim 1 wherein said first member is provided with said guideway and includes an element which extends transversely of said guideway, and said second member is provided with said shank portion having an elongated, longitudinally extending slot formed therein and slidably accommodating said element.

3. The adjustable temple of claim 2 wherein the slot formed within the shank portion is open-ended.

4. The adjustable temple of claim 1 wherein the elongated spring means within said guideway comprises a leaf spring adapted to normally assume a bowed condition.

5. The adjustable temple of claim 4 wherein the length of said leaf spring is substantially coextensive with the length of said guideway.

6. The adjustable temple of claim 2 wherein said spring means is provided with an opening slidably accommodating a portion of said transversely extending element.

7. The adjustable temple of claim 6 wherein the transversely extending element is a rivet interconnecting inner and outer walls of said guideway.

8. The adjustable temple of claim 4 wherein the length of said leaf spring is substantially less than the length of said guideway, and said one member is provided with a pair of longitudinally spaced elements disposed within said guideway and extending transversely thereof; one of said elements being slidably accommodated within an opening formed in said leaf spring and the second of said elements being disposed endwise of said leaf spring; the shank portion of said other member being provided with an elongated longitudinally extending slot slidably accommodating said pair of transversely extending elements.

9. The adjustable temple of claim 1 wherein said second member is provided with said guideway, said guideway and the ear-engaging portion of said member being in endwise relation.

10. The adjustable temple of claim 2 wherein said transversely extending element interconnects inner and outer walls forming said guideway.

11. The adjustable temple of claim 10 wherein the inner wall includes a pair of sections arranged in endwise relation, one of said sections being elongated and having an end thereof disposed adjacent the end of said first member adapted to be hingedly connected to the frame, said inner wall one section being interconnected to the outer wall by said element.

* * * * *

UNITED STATES PATENT OFFICE
CERTIFICATE OF CORRECTION

PATENT NO. : 3,873,192
DATED : March 25, 1975
INVENTOR(S) : Marshall N. Anderson It is certified that error appears in the above-identified patent and that said Letters Patent are hereby corrected as shown below:

Column 3, line 1, "eend" should be -- end --.

Column 3, line 17, "poriton" should be -- portion --.

Column 3, line 28, "theear" should be -- the ear --.

Column 4, line 41, before "type" insert -- a --.

Column 6, line 14, (claim 9), before "member" insert -- second --.

Signed and sealed this 10th day of June 1975.

(SEAL)
Attest:

RUTH C. MASON
Attesting Officer

C. MARSHALL DANN
Commissioner of Patents
and Trademarks